(12) United States Patent
Jha et al.

(10) Patent No.: US 12,463,870 B2
(45) Date of Patent: Nov. 4, 2025

(54) ROLLBACK FOR TARGET SUBSET OF CONFIGURATION

(71) Applicant: Juniper Networks, Inc., Sunnyvale, CA (US)

(72) Inventors: Akhil Kumar Jha, Sunnyvale, CA (US); Polisetty Rama Subbaiah, Karnataka (IN); Pallavi Ganny Krishnamurthy, Karnataka (IN)

(73) Assignee: Juniper Networks, Inc., Sunnyvale, CA (US)

( * ) Notice: Subject to any disclaimer, the term of this patent is extended or adjusted under 35 U.S.C. 154(b) by 151 days.

(21) Appl. No.: 18/331,433

(22) Filed: Jun. 8, 2023

(65) Prior Publication Data

US 2024/0414054 A1 Dec. 12, 2024

(51) Int. Cl.
*H04L 41/0859* (2022.01)
*H04L 41/0816* (2022.01)

(52) U.S. Cl.
CPC ...... *H04L 41/0863* (2013.01); *H04L 41/0816* (2013.01)

(58) Field of Classification Search
CPC .................. H04L 41/0863; H04L 41/0816
USPC ....................................................... 709/220
See application file for complete search history.

(56) References Cited

U.S. PATENT DOCUMENTS

| | | | |
|---|---|---|---|
| 7,096,256 B1* | 8/2006 | Shafer | H04L 41/0893 709/250 |
| 7,779,404 B2 | 8/2010 | Movassaghi et al. | |
| 9,027,077 B1* | 5/2015 | Bharali | G06F 21/00 726/1 |
| 9,929,910 B1 | 3/2018 | Chopra et al. | |
| 10,797,952 B1 | 10/2020 | Mills et al. | |
| 11,489,712 B1* | 11/2022 | Subbaiah | H04L 41/0806 |
| 2006/0007944 A1* | 1/2006 | Movassaghi | H04L 41/0813 370/401 |

FOREIGN PATENT DOCUMENTS

EP 2905982 B1 7/2019

OTHER PUBLICATIONS

Cisco, Configuration Fundamentals Configuration Guide, Cisco IOS Release 15.0S, Mar. 3, 2004, https://www.cisco.com/c/en/us/td/docs/ios/fundamentals/configuration/guide/15_0s/cf_15_0S_book/cf_config-rollback.html#wp1146581 (Year: 2004).*
Extended European Search Report for Application No. EP23191764.2 mailed on Jan. 18, 2024, 10 pages.

* cited by examiner

*Primary Examiner* — Zi Ye
(74) *Attorney, Agent, or Firm* — Harrity & Harrity, LLP (57) ABSTRACT

In some implementations, a network device may commit a configuration. The network device may obtain an indication to perform a rollback for a target subset of the configuration. The network device may perform based at least in part on the indication, the rollback for the target subset of the configuration.

20 Claims, 5 Drawing Sheets

ROLLBACK FOR TARGET SUBSET OF CONFIGURATION

BACKGROUND

A network operating system (NOS) management plane infrastructure (e.g., on a network device) may include a candidate data store and a running data store (e.g., an active configuration data store). A candidate data store includes configuration data (e.g., a candidate configuration of the network device) that can be manipulated without impacting the current (e.g., active) configuration of the network device. The candidate configuration is a full configuration data set that serves as a workplace for creating and manipulating configuration data. A network administrator can make additions, deletions, and other changes to the configuration data to construct desired configuration data.

When the content of the candidate configuration is complete, the configuration data can be "committed." The commit operation may be performed by the NOS, and may involve publishing the data set to the rest of the network device such that the network device conforms to behavior according to the committed configuration. For example, upon a successful commit operation (which can be performed at any time), the value of the running configuration or data store may be set to the value of the candidate configuration.

SUMMARY

Some implementations described herein relate to a method. The method may include committing, by a network device, a configuration. The method may include obtaining, by the network device, an indication to perform a rollback for a target subset of the configuration. The method may include performing, by the network device, based at least in part on the indication, the rollback for the target subset of the configuration.

Some implementations described herein relate to a non-transitory computer-readable medium that stores a set of instructions. The set of instructions comprises one or more instructions that, when executed by one or more processors of a network device, may cause the network device to commit a configuration. The one or more instructions, when executed by one or more processors of the network device, may cause the network device to obtain an indication to perform a rollback for a target subset of the configuration. The one or more instructions, when executed by one or more processors of the network device, may cause the network device to perform, based at least in part on the indication, the rollback for the target subset of the configuration.

Some implementations described herein relate to a network device. The network device may include one or more memories and one or more processors. The one or more processors may be configured to commit a configuration. The one or more processors may be configured to obtain an indication to perform a rollback for a target subset of the configuration. The one or more processors may be configured to perform, based at least in part on the indication, the rollback for the target subset of the configuration.

DETAILED DESCRIPTION

The following detailed description of example implementations refers to the accompanying drawings. The same reference numbers in different drawings may identify the same or similar elements.

A network operating system (NOS) management plane infrastructure may provide a feature called a "configuration rollback," which allows users to "rollback" a current configuration of a network device to any specified previous version or instance of a configuration. The NOS may support the rollback operation from a command line interface (CLI) as shown below:

```
user@router# rollback
load complete
```

When the "rollback" operation is performed, the candidate configuration of the network device is completely replaced with the specified (previous or "rollback") configuration. If the user (e.g., a network administrator) intends to set this rollback configuration as the active configuration of the network device, then the user may cause the NOS to commit the rollback configuration. However, because the network device can only rollback and/or commit the entirety of a configuration, the network device does not provide flexibility to rollback only the specific feature (e.g., a portion or subset) of the configuration (e.g., a configuration hierarchy).

For example, a network device may run an active configuration with the following configuration hierarchies:

```
system {
...
}
interfaces {
...
}
firewall {
policies {
...
}
}
```

At some point, a network administrator may realize that, because firewall policies that were present in an earlier configuration are not present in the current, active configuration, the earlier configuration should become active. The network administrator may perform a complete rollback to replace the entire active configuration with the previous configuration. For example, the network administrator may input the following commands into a CLI to perform the complete rollback from the top level of the configuration hierarchy, as shown below:

```
user@router# rollback 2
load complete
```

The "rollback 2" operation may replace the entire active configuration with the "rollback 2" configuration, which can introduce unintended changes to the configuration (e.g., to the system configuration, interfaces configuration, or the like). The network administrator may manually review and remove the unintended changes, or fetch the "rollback 2" configuration version and copy only the relevant portions from the "rollback 2" configuration version to load on the network device (e.g., only the firewall policies).

This largely manual rollback process is burdensome and can be particularly cumbersome if the network device is running a scale configuration. The rollback process may also involve a large amount of time to perform the rollback (e.g., due to the configuration load time associated with loading an entire configuration or due to the time involved in manually fetching and copying only relevant portions of a configuration). Furthermore, rolling back the entire configuration may impact many services (e.g., daemons) associated with the configuration.

Some implementations described herein enable a capability to rollback specific (e.g., specified) portions of a network device configuration. For example, a network administrator may flexibly choose which hierarchy or hierarchies within a configuration to rollback (e.g., rather than rolling back the entire configuration and/or manually copying only relevant portions from a previous configuration (e.g., policy)). The capability to rollback specific portions of a network device configuration may be provided as a feature in the NOS of a network device.

Rolling back specific portions of a network device configuration may reduce the amount of time to perform the rollback. For example, the configuration load time associated with a portion of a network device configuration may be less than the configuration load time associated with an entire network device configuration. The amount of time to perform the rollback may be significantly reduced in scale scenarios (e.g., scenarios involving multiple network devices).

Furthermore, the quantity of services impacted by rolling back a portion of a network device configuration may be less than the quantity of services impacted by rolling back an entire network device configuration. For example, the rollback of the portion of the network device configuration may impact only those services associated with that portion (e.g., due to a hang-up of the portion of the network device configuration). Other services may not be impacted by the rollback.

Figure 1:
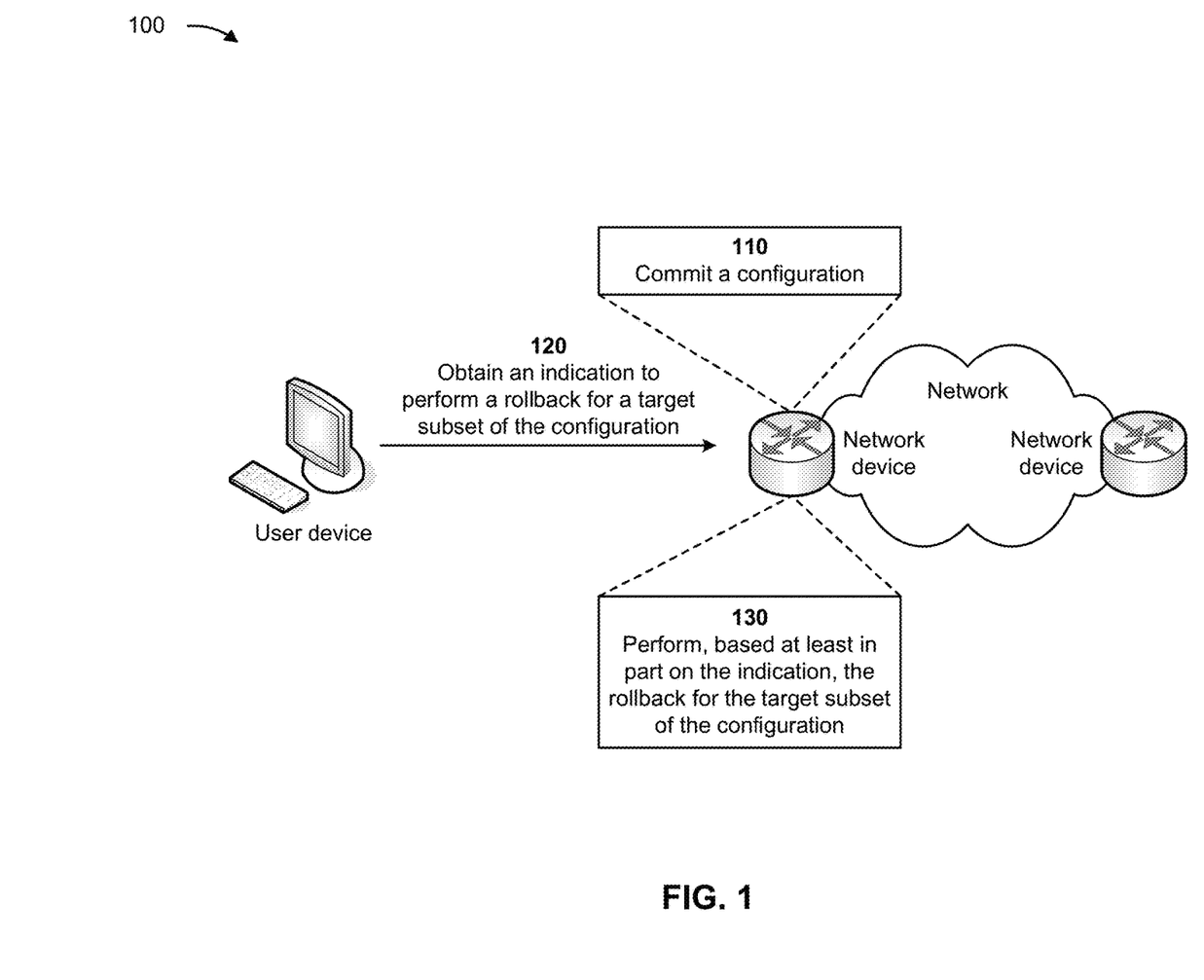
FIG. 1 is a diagram of an example implementation associated with rolling back a target subset of a configuration.

FIG. 1 is a diagram of an example implementation 100 associated with rolling back a target subset of a configuration. As shown in FIG. 1, example implementation 100 includes a user device and a network that includes a plurality of network devices. These devices are described in more detail below in connection with FIGS. 2-4.

As shown by reference number 110, a network device may commit a configuration. For example, the network device may publish a candidate configuration stored in a candidate data store such that the candidate configuration becomes the active configuration. In some examples, the network device may have been configured with one or more other (e.g., previous) configurations.

In some aspects, the configuration may be arranged as a hierarchy (e.g., the configuration may be a hierarchical configuration). For example, the hierarchy (or the hierarchical configuration) may have a top level and one or more levels beneath the top level. For example, the hierarchy (or the hierarchical configuration) may include a top level and, beneath the top level, a level associated with system configuration features, a level associated with interface configuration features, a level associated with firewall policies, or the like.

As shown by reference number 120, the network device may obtain, from the user device (e.g., a user device associated with a network administrator), an indication to perform a rollback for a target subset of the configuration. The target subset may be a portion of the configuration that is specifically targeted for rollback. For instance, the indication may specify the target subset. In one example, the target subset may be associated with firewall policies. For example, the target subset may be associated with a level of the configuration beneath the top level, such as a level associated with firewall policies.

In some examples, the network device may obtain the indication based at least in part on a command that is provided from a top level of the hierarchy (or of the hierarchical configuration). For example, the network administrator may prompt the network device to perform a rollback of the firewall policies from the top level, as shown in the example CLI provided as follows:

```
[edit]
user@router# rollback 2 configuration-path "firewall policies"
load complete
[edit]
```

In some examples, the network device may obtain the indication based at least in part on a command that is provided from a level of the hierarchy (or of the hierarchical configuration) that is associated with the target subset of the configuration (e.g., (the hierarchical configuration). For example, the network administrator may go to the firewall policies edit path (e.g., a level associated with the firewall policies) and then prompt the network device to perform the rollback, as shown in the example CLI provided as follows:

```
[edit firewall policies]
user@router# rollback 2 relative
load complete
[edit firewall policies]
```

In either approach (e.g., providing the command from the top level or the level associated with the target subset), the network device may load the target subset (e.g., the portion of the configuration associated with the path [edit firewall policies]). For example, the network device may load only the target subset (e.g., and not the remaining subsets of the configuration). Thus, both approaches may result in the same end functionality whereby the target subset of the configuration is rolled back.

In some examples, the network device may obtain the indication based at least in part on an extensible markup language (XML) attribute (e.g., "rollback-configuration-relative-path"). For example, the network administrator may input the XML attribute into a CLI, as shown below:

```
<rpc>
  <load-configuration rollback="2" rollback-configuration-relative-
```

```
path="/configuration/firewall/policies"/>
</rpc>
```

The XML attribute may provide XML application programming interface (API) (XML-API) support for the capability to perform a rollback for a target subset of the configuration. The XML attribute may enable use of XML path language (XPath) to process a hierarchy of the configuration.

As shown by reference number 130, the network device may perform, based at least in part on the indication, the rollback for the target subset of the configuration. For example, the network device may process the indication, identify the target subset (e.g., firewall policies) and rollback the firewall policies. In some examples, the network device may perform the rollback for only the target subset of the configuration and may refrain from performing a rollback for a non-targeted subset of the configuration. For instance, if the target subset is associated with firewall policies, then the network device may refrain from performing a rollback for subsets that are unrelated to firewall policies, such as system configuration features, interface configuration features, or the like.

In some examples, the network device may perform the rollback from the target subset of the configuration to a corresponding subset of another (e.g., a previous) configuration. For example, if the target subset is associated with firewall policies, then the network device may perform the rollback from the firewall policies associated with the configuration to the firewall policies associated with the previous configuration. The other configuration may be a previous configuration because the network device may have committed the other configuration before committing the first configuration.

Performing the rollback for the target subset of the configuration may reduce the amount of time involved in performing a rollback. For example, the configuration load time associated with the target subset of the configuration may be less than the configuration load time associated with rolling back an entire network device configuration. Performing the rollback for the target subset of the configuration may significantly reduce the amount of time involved in performing the rollback in scale scenarios.

Furthermore, the quantity of services impacted by performing the rollback for the target subset of the configuration may be less than the quantity of services impacted by performing a rollback of an entire network device configuration. For example, the rollback of the target subset of the configuration may impact only services associated with the target subset without impacting other services that would be impacted by a rollback of the entire configuration.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
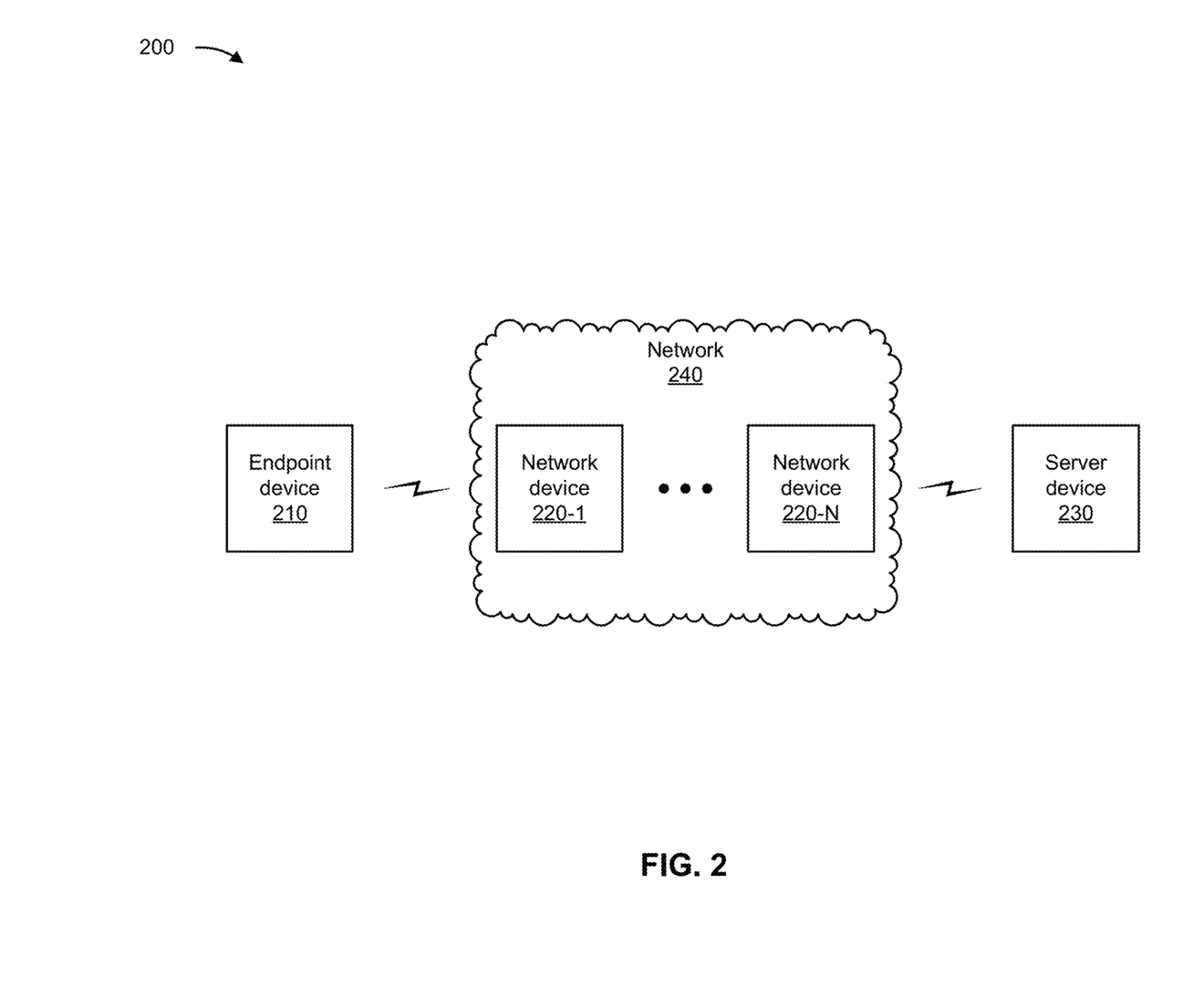
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a group of network devices 220 (shown as network device 220-1 through network device 220-N), a server device 230, and a network 240. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 210 may receive network traffic from and/or may provide network traffic to other endpoint devices 210 and/or server device 230, via network 240 (e.g., by routing packets using network devices 220 as intermediaries).

Network device 220 includes one or more devices capable of receiving, processing, storing, routing, and/or providing traffic (e.g., a packet or other information or metadata) in a manner described herein. For example, network device 220 may include a router, such as a label switching router (LSR), a label edge router (LER), an ingress router, an egress router, a provider router (e.g., a provider edge router or a provider core router), a virtual router, or another type of router. Additionally, or alternatively, network device 220 may include a gateway, a switch, a firewall, a hub, a bridge, a reverse proxy, a server (e.g., a proxy server, a cloud server, or a data center server), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 240.

Server device 230 includes one or more devices capable of receiving, generating, storing, processing, and/or providing information, such as information described herein. For example, server device 230 may include a laptop computer, a tablet computer, a desktop computer, a group of server devices, or a similar type of device, associated with multicast traffic. In some implementations, server device 230 may receive information from and/or transmit information (e.g., multicast traffic) to endpoint device 210, via network 240 (e.g., by routing packets using network devices 220 as intermediaries).

Network 240 includes one or more wired and/or wireless networks. For example, network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber opticbased network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
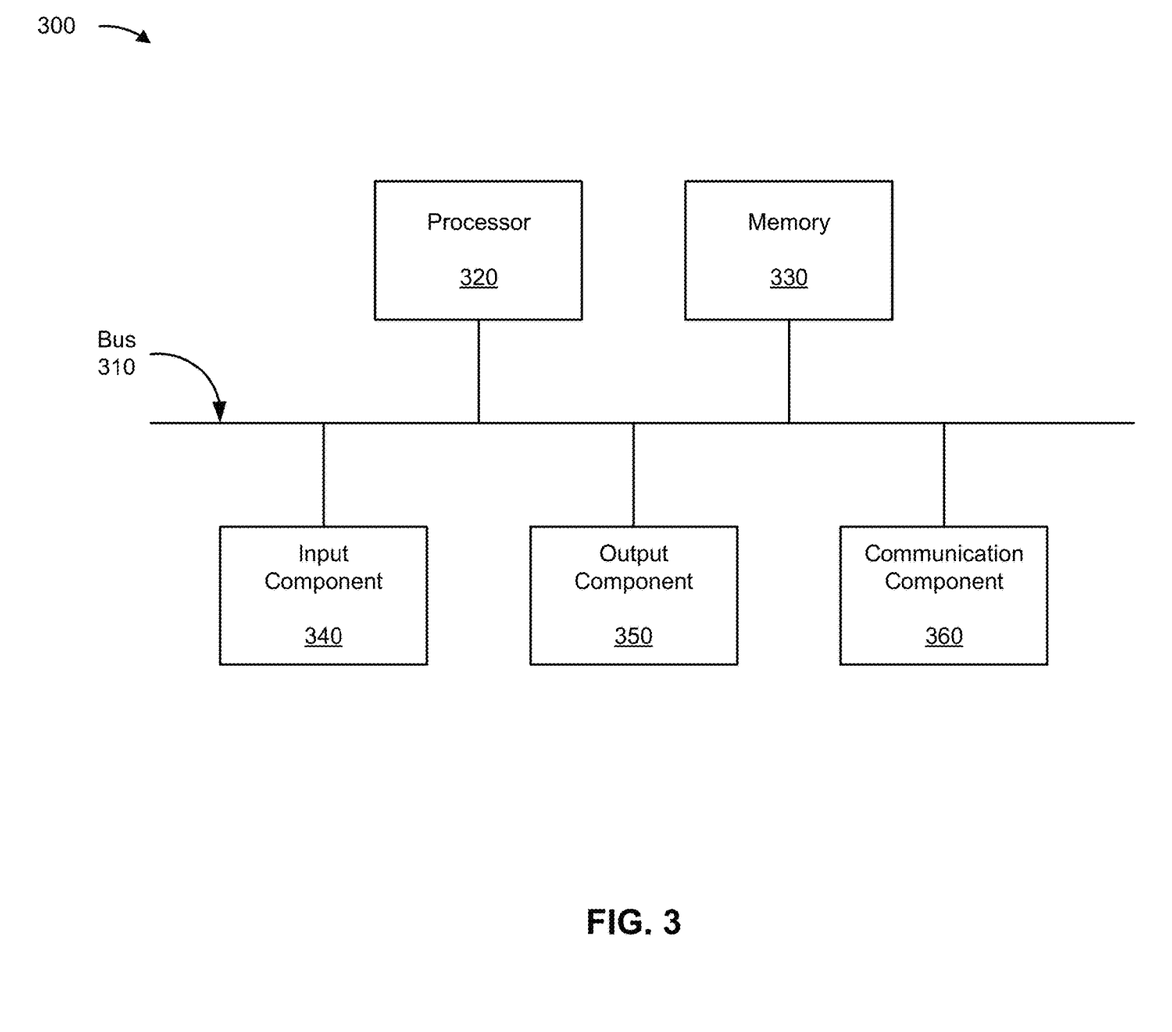
FIG. 3 is a diagram of example components of a device associated with rolling back a target subset of a configuration.

FIG. 3 is a diagram of example components of a device 300 associated with rolling back a target subset of a configuration. The device 300 may correspond to endpoint device 210, network device 220, and/or server device 230. In some implementations, endpoint device 210, network device 220, and/or server device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
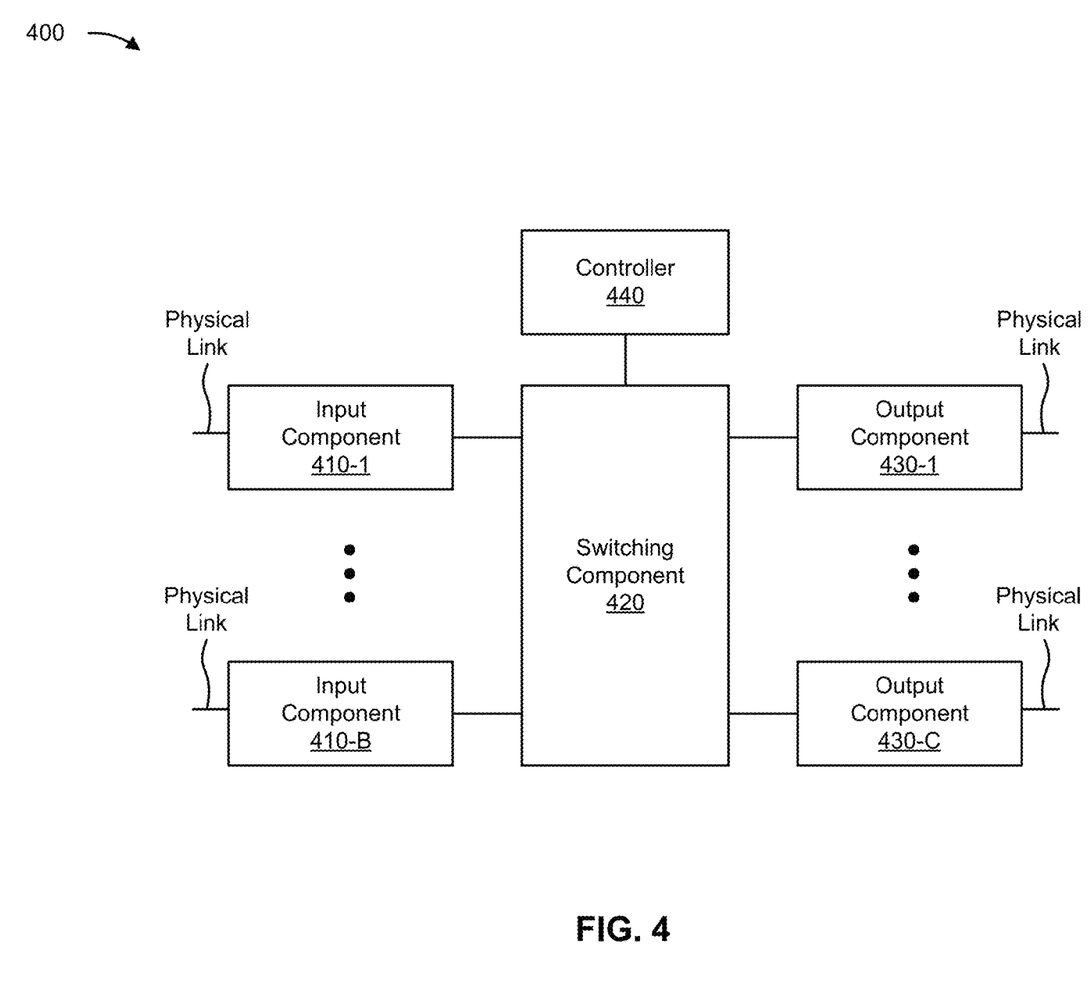
FIG. 4 is a diagram of example components of a device associated with rolling back a target subset of a configuration.

FIG. 4 is a diagram of example components of a device 400 associated with rolling back a target subset of a configuration. Device 400 may correspond to network device 220. In some implementations, network device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
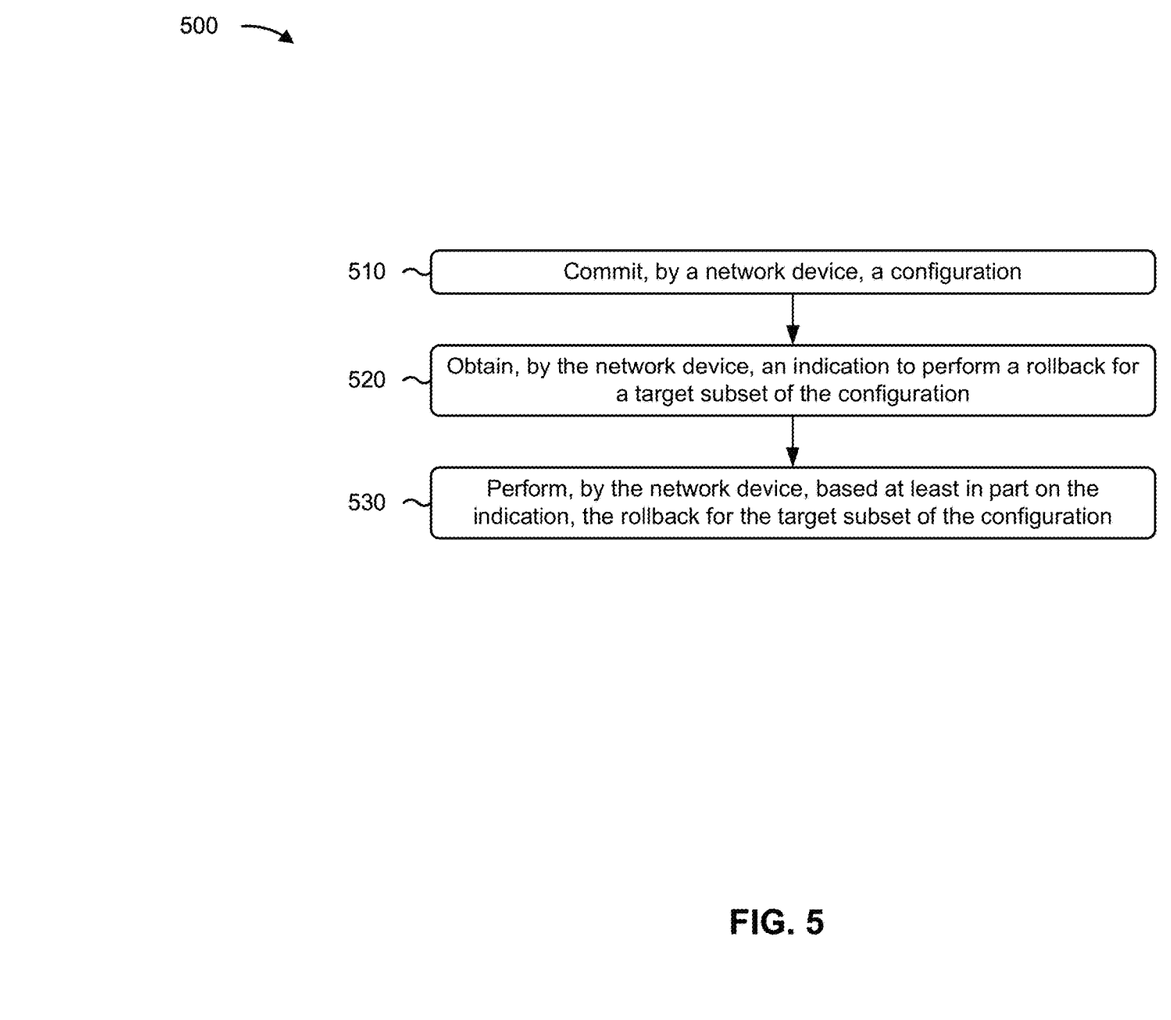
FIG. 5 is a flowchart of an example process associated with performing a rollback for a target subset of a configuration.

FIG. 5 is a flowchart of an example process 500 associated with performing a rollback for a target subset of a configuration. In some implementations, one or more process blocks of FIG. 5 are performed by a network device (e.g., network device 220). In some implementations, one or more process blocks of FIG. 5 are performed by another device or a group of devices separate from or including the network device, such as the network device (e.g., network device 220). Additionally, or alternatively, one or more process blocks of FIG. 5 may be performed by one or more components of device 300, such as processor 320, memory 330, input component 340, output component 350, and/or communication component 360. Additionally, or alternatively, one or more process blocks of FIG. 5 may be performed by one or more components of device 400, such as input components 410, switching component 420, output components 430, and/or controller 440.

As shown in FIG. 5, process 500 may include committing a configuration (block 510). For example, the network device may commit a configuration, as described above.

As further shown in FIG. 5, process 500 may include obtaining an indication to perform a rollback for a target subset of the configuration (block 520). For example, the network device may obtain an indication to perform a rollback for a target subset of the configuration, as described above.

As further shown in FIG. 5, process 500 may include performing based at least in part on the indication, the rollback for the target subset of the configuration (block 530). For example, the network device may perform based at least in part on the indication, the rollback for the target subset of the configuration, as described above.

Process 500 may include additional implementations, such as any single implementation or any combination of implementations described below and/or in connection with one or more other processes described elsewhere herein.

In a first implementation, process 500 includes refraining, by the network device, from performing a rollback for a non-targeted subset of the configuration.

In a second implementation, alone or in combination with the first implementation, performing the rollback includes performing the rollback from the target subset of the configuration to a corresponding subset of another configuration.

In a third implementation, alone or in combination with one or more of the first and second implementations, the configuration is arranged as a hierarchy.

In a fourth implementation, alone or in combination with one or more of the first through third implementations, obtaining the indication includes obtaining the indication based at least in part on a command that is provided from a top level of the hierarchy.

In a fifth implementation, alone or in combination with one or more of the first through fourth implementations, obtaining the indication includes obtaining the indication based at least in part on a command that is provided from a level of the hierarchy that is associated with the target subset of the configuration.

In a sixth implementation, alone or in combination with one or more of the first through fifth implementations, obtaining the indication includes obtaining the indication based at least in part on an extensible markup language attribute.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   committing, by a network device, a configuration,
      wherein a plurality of subsets of the configuration are organized in a hierarchy comprising at least:
         a top level,
         a first level, within the top level, associated with a system configuration,
         a second level, within the top level, associated with an interface configuration, and
         a third level, within the top level, associated with a firewall policy;
   obtaining, by the network device, an indication to perform a rollback for a target subset of the plurality of subsets of the configuration,
      wherein the target subset corresponds to a particular level of the hierarchy; and
   performing, by the network device, based at least in part on the indication, the rollback for the target subset of the configuration,
      wherein an application programming interface (API) is provided to perform the rollback.

2. The method of claim 1, further comprising:
   refraining, by the network device, from performing a rollback for a non-targeted subset of the configuration.

3. The method of claim 1, wherein performing the rollback includes:
   performing the rollback from the target subset of the configuration to a corresponding subset of another configuration.

4. The method of claim 1, wherein obtaining the indication includes:
   obtaining the indication based at least in part on a command that is provided from the top level of the hierarchy.

5. The method of claim 1, wherein obtaining the indication includes:
   obtaining the indication based at least in part on a command that is provided from a level of the hierarchy that is associated with the target subset of the configuration.

6. The method of claim 1, wherein obtaining the indication includes:
   obtaining the indication based at least in part on an extensible markup language attribute.

7. A non-transitory computer-readable medium storing a set of instructions, the set of instructions comprising:
   one or more instructions that, when executed by one or more processors of a network device, cause the network device to:
      commit a configuration,
         wherein a plurality of subsets of the configuration are organized in a hierarchical configuration comprising at least:
            a top level,
            a first level, within the top level, associated with a system configuration, a second level, within the top level, associated with an interface configuration, and a third level, within the top level, associated with a firewall policy;

obtain an indication to perform a rollback for a target subset of the plurality of subsets of the configuration, wherein the target subset corresponds to a particular level of the hierarchical configuration; and perform, based at least in part on the indication, the rollback for the target subset of the configuration, wherein an application programming interface (API) is provided to perform the rollback.

8. The non-transitory computer-readable medium of claim 7, wherein the one or more instructions, that cause the network device to perform the rollback, cause the network device to:

perform, based at least in part on the indication, the rollback for only the target subset of the configuration.

9. The non-transitory computer-readable medium of claim 7, wherein the configuration is a first configuration, and wherein the one or more instructions, that cause the network device to perform the rollback, cause the network device to:

perform the rollback from the target subset of the first configuration to a corresponding subset of a second configuration that the network device committed before committing the first configuration.

10. The non-transitory computer-readable medium of claim 7, wherein the one or more instructions, that cause the network device to obtain the indication, cause the network device to:

obtain the indication based at least in part on a command that is provided from the top level of the hierarchical configuration.

11. The non-transitory computer-readable medium of claim 7, wherein the one or more instructions, that cause the network device to obtain the indication, cause the network device to:

obtain the indication based at least in part on a command that is provided from a level of the hierarchical configuration that is associated with the target subset of the hierarchical configuration.

12. The non-transitory computer-readable medium of claim 7, wherein the one or more instructions, that cause the network device to obtain the indication, cause the network device to:

obtain the indication based at least in part on an extensible markup language attribute.

13. A network device, comprising:
one or more memories; and
one or more processors to:
commit a configuration,
wherein a plurality of subsets of the configuration are organized in a hierarchy comprising at least:
a top level,
a first level, within the top level, associated with a system configuration,
a second level, within the top level, associated with an interface configuration, and
a third level, within the top level, associated with a firewall policy;
obtain an indication to perform a rollback for a target subset that corresponds to a particular level of the configuration; and
perform, based at least in part on the indication, the rollback for the target subset of the configuration,
wherein an application programming interface (API) is provided to perform the rollback.

14. The network device of claim 13, wherein the one or more processors are further to:
refrain from performing a rollback for a non-targeted subset of the configuration.

15. The network device of claim 13, wherein the one or more processors, to perform the rollback, are to:
perform the rollback from the target subset of the configuration to a corresponding subset of another configuration.

16. The network device of claim 13, wherein the one or more processors, to obtain the indication, are to:
obtain the indication based at least in part on a command that is provided from the top level of the hierarchy.

17. The network device of claim 13, wherein the one or more processors, to obtain the indication, are to:
obtain the indication based at least in part on a command that is provided from a level of the hierarchy that is associated with the target subset of the configuration.

18. The network device of claim 13, wherein the one or more processors, to obtain the indication, are to:
obtain the indication based at least in part on an extensible markup language attribute.

19. The network device of claim 13, wherein the target subset is associated with a level of the hierarchy that is beneath the top level.

20. The network device of claim 19, wherein the indication to perform the rollback is at least one of:
received from a user device, or
obtained based on a command that is provided by a level of the hierarchy that is not the top level.

* * * * *